(12) United States Patent
Gearhart

(10) Patent No.: US 8,328,969 B2
(45) Date of Patent: Dec. 11, 2012

(54) METHOD AND SYSTEM FOR CURING PIPE LINERS USING MICROWAVE ENERGY

(76) Inventor: Stephen V. Gearhart, Waterloo, IA (US)

( * ) Notice: Subject to any disclaimer, the term of this patent is extended or adjusted under 35 U.S.C. 154(b) by 0 days.

(21) Appl. No.: 12/983,983

(22) Filed: Jan. 4, 2011

(65) Prior Publication Data
US 2011/0094654 A1    Apr. 28, 2011

(51) Int. Cl.
*B32B 41/00*    (2006.01)
(52) U.S. Cl. ............ 156/64; 156/287; 156/293; 156/294
(58) Field of Classification Search ............... 156/64, 156/273.7, 287, 293, 294, 351, 359, 367; 264/36.16, 36.17, 269; 219/679
See application file for complete search history.

(56) References Cited

U.S. PATENT DOCUMENTS

| | | | |
|---|---|---|---|
| 4,064,211 A | 12/1977 | Wood | |
| 5,073,315 A * | 12/1991 | Bertelson | 264/490 |
| 5,393,481 A | 2/1995 | Wood | |
| 5,634,743 A | 6/1997 | Chandler | |
| 5,740,838 A * | 4/1998 | Satake et al. | 138/97 |
| 5,919,002 A | 7/1999 | Ramp | |
| 6,053,211 A | 4/2000 | Schwert et al. | |
| 6,167,913 B1 | 1/2001 | Wood et al. | |
| 6,170,531 B1 | 1/2001 | Jung et al. | |
| 6,270,599 B1 * | 8/2001 | Wood | 156/64 |
| 6,360,780 B1 | 3/2002 | Adolphs et al. | |
| 6,427,726 B1 | 8/2002 | Kiest, Jr. | |
| 6,478,054 B1 | 11/2002 | Kiest | |
| 6,708,729 B1 | 3/2004 | Smith | |
| 6,932,116 B2 | 8/2005 | Smith et al. | |
| 6,986,813 B2 | 1/2006 | Davis | |
| 7,104,317 B2 | 9/2006 | Richard et al. | |
| 7,188,678 B2 | 3/2007 | Richard et al. | |
| 7,338,687 B2 | 3/2008 | Davis | |
| 7,360,559 B2 | 4/2008 | Driver et al. | |
| 7,374,127 B2 | 5/2008 | Gallagher et al. | |
| 7,640,950 B2 | 1/2010 | Tan | |
| 7,641,756 B2 | 1/2010 | Schwert | |
| 2003/0077125 A1 | 4/2003 | Ploeg | |
| 2004/0036202 A1 | 2/2004 | Weatherby et al. | |
| 2006/0254711 A1 * | 11/2006 | Schwert | 156/293 |

FOREIGN PATENT DOCUMENTS
WO    9612605    5/1996

OTHER PUBLICATIONS
U.S. Office Action dated Oct. 28, 2011 from divisional related application.

* cited by examiner

*Primary Examiner* — George Koch
(74) *Attorney, Agent, or Firm* — Brett D. Papendick; Shuttleworth & Ingersoll, PLC

(57) ABSTRACT

A method for curing a resin contained in a liner of an underground pipe or passageway by use of a mobile magnetron module. The module navigates the length of the passageway of pipe via air pressure which also keeps the liner inflated. A winch attached to the module regulates the rate at which the module traverses the passageway or pipe. As the module makes its way through the passageway or pipe, the magnetron emits microwaves which cures the resin. Additionally, a thermal imaging camera can be utilized in the module or trailing the module to monitor the status of the curing of the resin in its entirety.

12 Claims, 5 Drawing Sheets

METHOD AND SYSTEM FOR CURING PIPE LINERS USING MICROWAVE ENERGY

BACKGROUND

This invention generally relates to the lining of passageways and pipelines. It is well known in the art to line an existing underground pipe or passageway by introducing a flexible tubular liner into the pipe at one end. Typically, the liner includes a portion that is impermeable to fluid and a portion that includes a curable resin. The liner is placed into one end of the pipe and anchored at that end. The liner then progresses via an eversion process throughout the interior of the pipe or is pulled in by a winch. The liner is, therefore, turned inside out as it makes its way through the pipe. The liner can also be coated on both sides of the resin impregnated fabric.

The means to evert the liner is typically fluid pressure produced by partially filling the everted liner in the passageway with a liquid. Curing of the resin is the chemical reaction which is accelerated by an elevated temperature. When liquid is used, the resin is cured by supplying the liquid at a controlled temperature which is sufficient to set the resin. The fluid pressure of the heated liquid is maintained in the pipe until the resin has properly cured. After curing, the existing pipe is sealed by the new liner which will have repaired cracks or other damage to the original pipe or previous liner. Typically, the lined pipe is equal to or greater in strength that the original pipe.

One of the deficiencies in the prior art associated with cured in place pipes is that the cure process requires refrigeration of the liner prior to installation to extend the pot life of the resin so that the resin does not prematurely set prior to installation in the pipe. Additionally, the resins compatible with the methods of the prior art may necessitate a resin possessing a long cure time. As such, the prior art methods consume large amounts of resources and energy in the refrigeration of the resin as well as the curing of the resin through water or by the use of a combination of steam and air and sometimes by the use of ultraviolet light. Furthermore, monitoring the progress of the curing process is difficult, which leads to inefficient use of materials and labor. Additionally, under-cured or incomplete cure of the resin can lead to lifts or compromised physical properties of the resin and liner.

It is therefore an object of the present invention to provide a method which cures the liner by means of using microwave energy to deposit thermal energy into the resin to speed up the curing process.

It is another object of the present invention to provide a method for monitoring the temperature of the resin in the liner so as to monitor the cure process along the entire periphery and length of the pipe liner.

It is another object of the present invention to provide a liner fabric which cures in an accelerated manner due to the microwave sensitivity of the fabric.

It is yet another object of the present invention to add a shielding layer to the fabric tube to prevent the microwave energy from escaping the tube during the cure process where the pipe being repaired is non-metallic or covered with dirt or other shielding materials.

It is yet another object of the present invention to provide a method for lining pipes which does not necessarily require refrigeration of the liner prior to installation.

SUMMARY OF THE INVENTION

The present invention utilizes a movable module in a passageway or pipe to cure a resin contained in the fabric liner of a pipe which may or may not contain fiberglass. The module can be used in conjunction with the known processes of lining a passageway or pipe by either the eversion process or a pull-in liner using a winch and cable. With the latter process, the liner usually has an impermeable coating on both sides. After the liner is placed in the passageway or pipe, the liner remains pushed up against the sides of the pipe by a fluid pressure, preferably air pressure.

The movable module may contain a magnetron which emits microwave radiation. Preferably, the microwave energy emitted by the magnetron is contained in the module, although in small pipes the magnetron may be located at the surface and transmit the energy through a microwave coax or waveguide. In addition to the magnetron, the module preferably contains a camera capable of monitoring the temperature of the resin and thus monitor the cure process of the resin; however, the camera can be separate from the module and trail or proceed the module in the passageway or pipe. The camera can be a thermal imaging camera. The module can be what is commonly known as a pipeline pig or contain wheels. The module can be attached to a cable and a power supply, or a cable constructed to accomplish both needs. The cable is also attached to a winch.

The movable module is lowered into one end of the liner that has been everted into the passageway or pipe. Air pressure is then used to push the module toward the second end; however, the cable remains taut and controls forward movement of the module. With the pipe liner inflated and kept at a predetermined pressure, the module will move a predetermined distance then stop for a period of approximately thirty seconds, at which time a switch activates the magnetron. A secondary device which monitors and controls the switch can be regulated by another switch that monitors horizontal position of the module. This switch can be over-ridden in the case of vertical pipeline applications. The magnetron then begins to emit radiation within the liner which starts the cure process of the resin. The camera monitors the progression of the module and status of the resin and cure process by thermal imaging. The module is allowed movement by preset temperature monitoring by the thermal imaging software that controls the speed at which the module travels the liner of the pipe. All data including temperature, footage location of the module, pressure and video of the thermal image can be recorded on a DVD or some other recording device at the control station. A loss of fluid pressure during the process will lead to automatic shut down.

Once the resin reaches a critical cure point determined by the imaging software, a controlling unit communicates with the module and the winch. The winch then allows additional cable to be released which in turns allows the air pressure to further advance the module. The process repeats until the desired portion or all of the liner in the passageway or pipe has been sufficiently cured. The rate of speed of the module is dependent on external conditions and the type of resin used in the liner. The process may be a continuous process, or if necessary to properly cure the resin, the module may be held in place for a short time and then advanced. The thermal imaging camera and the software assist in the determination of the rate of speed of the movable module and completeness of the cure.

Once the module reaches the second end of the pipe, it is de-energized and can then be removed from the pipe. The cable and a power supply cable can be disconnected from the module and then the winch can retract the cable and/or the power supply cable, or the entire unit may be retracted to the starting point and removed.

DETAILED DESCRIPTION

Figure 1:
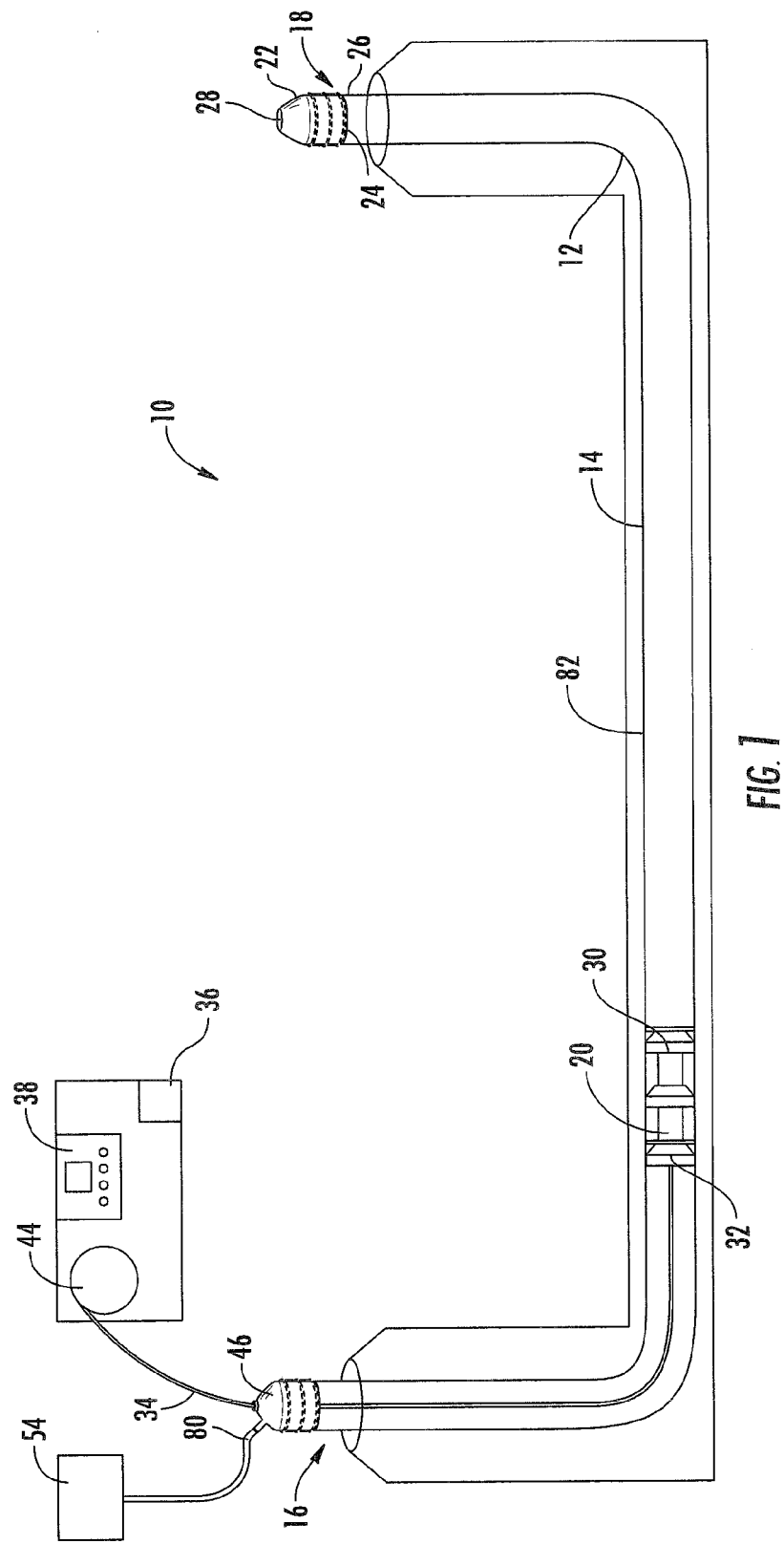
FIG. 1 is a schematic front view of the system of the invention showing the curing module within a pipe between a first and second end.
Figure 7:
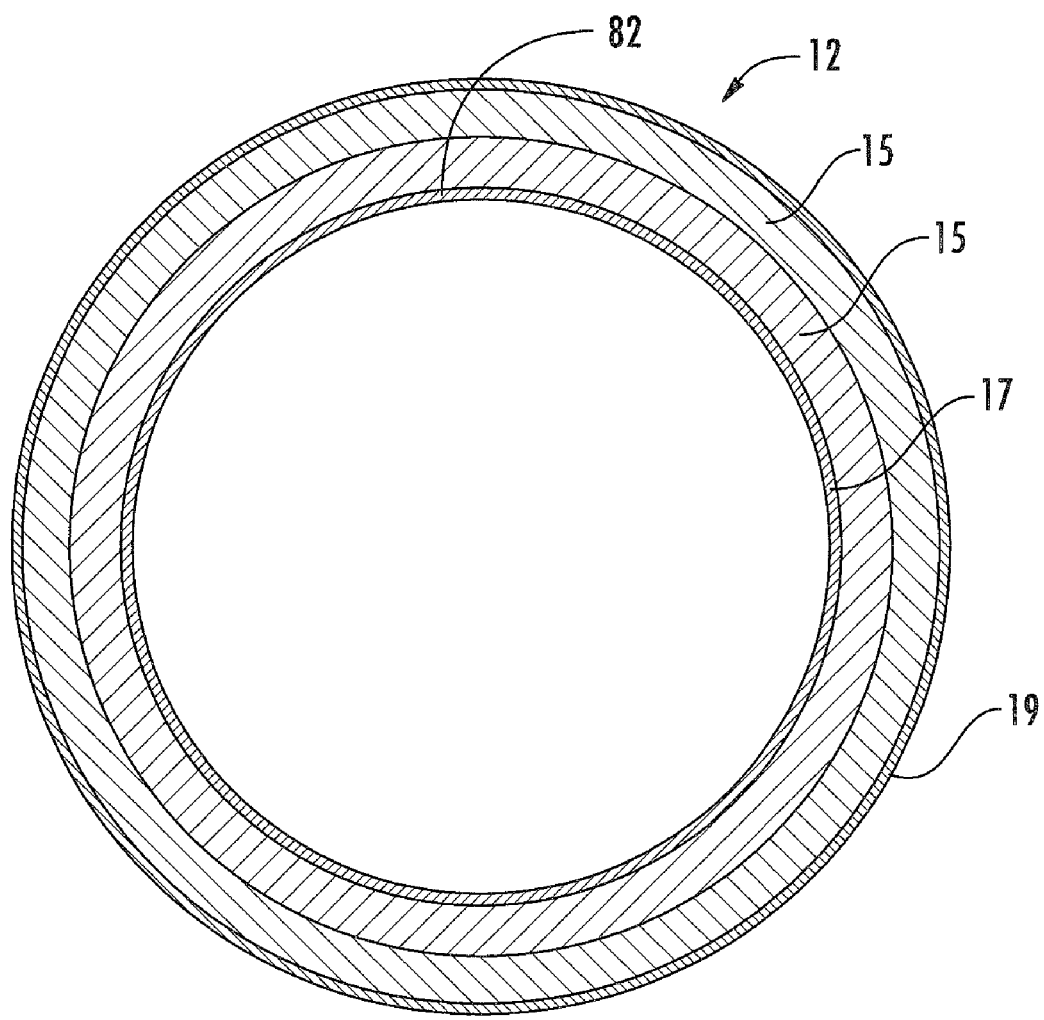
FIG. 7 is a sectional end view of a liner of the type used in carrying out the invention.

Now referring to the drawings, FIG. 1 shows a system 10 for curing a liner 12 within a pipe 14. The liner 12 has a first end 16 and a second end 18. The liner 12 is placed in the length of the pipe 14 in any effective manner but preferably using the known method in which a liner is installed by everting the liner. FIG. 7 shows the layers of a liner 12 of the type used in carrying out the invention. The layers typically include felt/fiberglass layers 15, an impermeable coating layer 17 and may contain a microwave impermeable layer 19. The impermeable coating layer 17 contains a resin material 82 that will partially or completely absorb incident microwave radiation in order to initiate or accelerate the cure process. The layer 19 will only be needed in certain cases and never extends the entire length of the liner. When used, the purpose of the layer 19 is to protect the operators at the exposed ends of the liner. Also, a screen may be placed over the manhole and over the exposed ends of the liner to prevent microwaves from escaping. The liner 12 is clamped at the first end 16 with a suitable clamping device (not shown). A covering 22 is placed and secured on the second end 18, preferably through the use of clamps 24 and clamping ribs 26. The second end 18 has an adjustable orifice 28 which allows the flow of air exiting the second end 18 to be controlled. The orifice 28 can be a ball valve.

Figure 2:
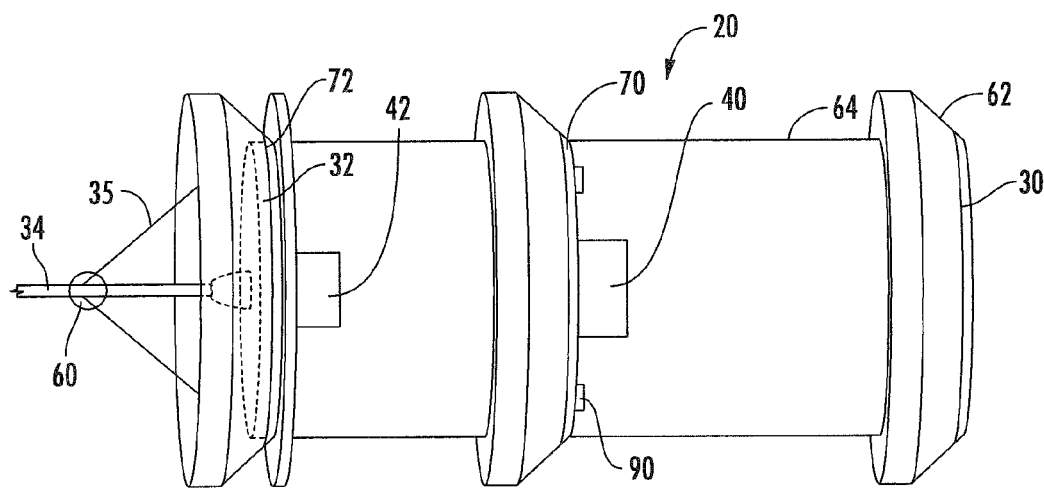
FIG. 2 is a perspective view of the curing module of FIG. 1.

A module 20 is placed in the liner 12 at the first end 16. As shown in FIG. 2 the module 20 has a front end 30 and a rear end 32. The rear end 32 contains a mechanism for attaching a cable 34 to the module 20. The cable 34 serves as the means to bring power from a suitable power supply 36 to the module 20 and connect the module 20 to a control station 38. In order to prevent unwanted unplugging of the cable 34 from the module 20 toward the second end 18, at least one secondary cable 35 can be attached from the rear end 32 to a cable clamp 60. The secondary cable 35 is of a length such that movement of the module 20 will exert pressure on the cable clamp 60, therefore, preventing the cable 34 from unintentionally disconnecting from the module 20. The cable 34 is also attached to a winch 44 which can be a part of the control station 38. The module 20 includes a microwave applicator, such as magnetron 40, positioned between the front end 30 and the rear end 32 and a thermal imaging device 42 positioned ahead of the magnetron 40. Although the thermal imaging module 42 is shown as being mounted ahead of the magnetron 40, it should be understood that the relative positions of the magnetron 40 and the thermal imaging module 42 could be reversed.

Figure 3:
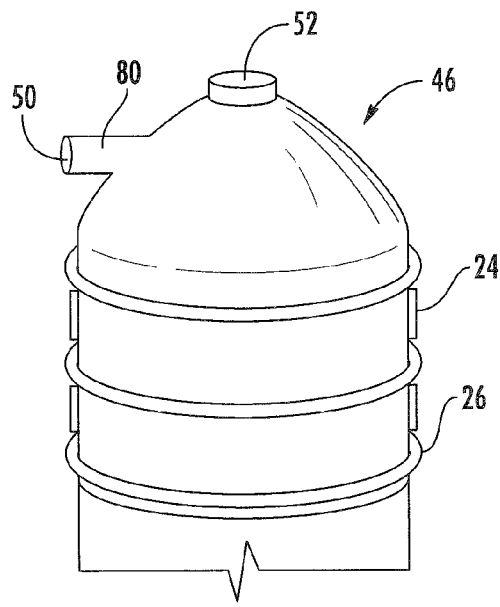
FIG. 3 is a perspective view of the first end of the liner.
Figure 4:
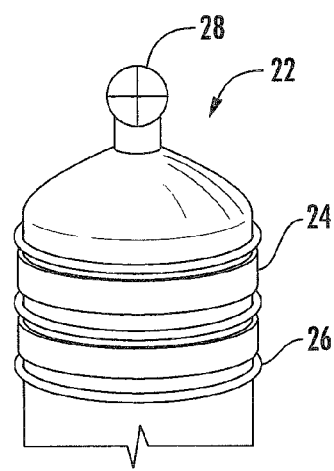
FIG. 4 is a perspective view of the second end of the liner.
Figure 5:
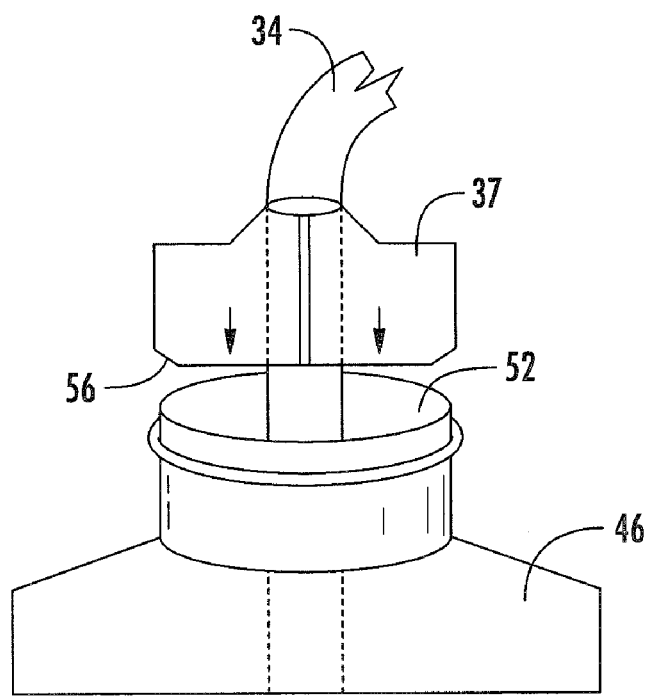
FIG. 5 is a detailed view of a portion of the first end of FIG. 3.
Figure 6:
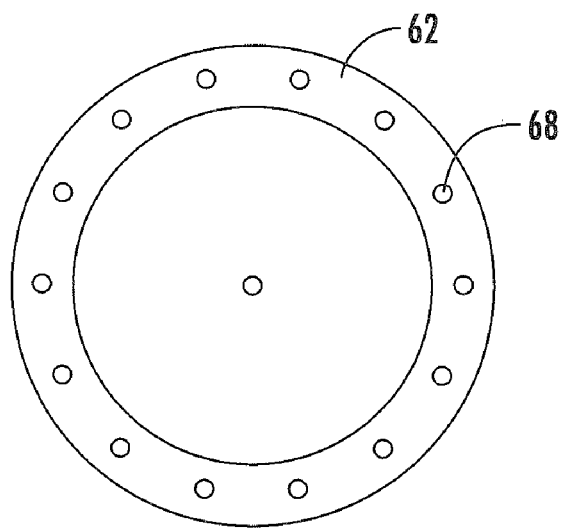
FIG. 6 is an end view of the curing module.

Again referring to FIG. 1, once the module 20 is introduced into the first end 16 of the liner 12, a second covering 46 is placed over the first end 16 of the liner 12. As shown in FIGS. 3 and 5, the second covering 46 is secured over the first end 16 of the liner 12, preferably with clamps 24 and clamping ribs 26. The second covering 46 includes a first opening 50 and a second opening 52. The first opening 50 is connected to an air supply 54, while the cable 34 is placed within the second opening 52. A seal fits around the cable 34 and occupies the space between the cable 34 and the second opening 52 such that an air tight seal is formed. Preferably, the seal is a two-piece rubber seal 37 which includes an internal bevel 56 or flexible lips that seal while the liner 12 is pressurized. The seal 37 can be held in place with the use of an over-center clamp or other suitable means (not shown).

Again referring to FIG. 2, the module 20 is shown in greater detail. The module 20 is preferably of a shape similar to what is know in the art as a "pipe pig" which is typically used for cleaning pipes. The module 20 therefore has a main body 64 that is generally cylindrical in shape and hollow with a disc 62 at the front end 30 and a disc 72 at the rear end 32. The discs extend outwardly beyond the main body 64 and the diameter of the discs 62 and 72 is such that the discs will come in contact with the inner diameter of the liner 12 and thus stabilize and guide the module as it is passed through the liner. Thus, the outer diameter of the discs 62 and 72 is preferably larger than the diameter of the main body 64. The front portion of the disc 62 extends past the main body 64. Preferably, the module 20 includes one of more middle discs 70 which has the same diameter as the discs 62 and 72. As the diameters of pipes vary, modules of different diameters will be needed depending on the size of the particular pipe being lined. In practice, the module is used in pipes of at least four inches in diameter.

The portion of main body 64 between the discs 70 and 62 is a cylindrical exterior wall made of a material, such as glass, that forms a chamber between the discs 70 and 62. The portions of the discs 70 and 62 inside the main body 64 are each preferably provided with a microwave screen which has a plurality of openings 68, which screens confine the microwave energy emitted by the magnetron 40 to the chamber formed between the discs 70 and 62. With the magnetron 40 mounted on the disc 70, the microwaves will be directed into this chamber and allowed to pass through the exterior wall and be absorbed into the coating layer 17 of the liner 12. The outer portions of each of the discs 70 and 62 that extend outwardly beyond the main body 64 preferably are of a metallic material or have a metallic backing to contain the microwaves emitted from the chamber and maximize absorption of the microwaves into the layer 17. Similar to the components of the second embodiment shown in FIG. 8 and described hereinafter, if desired, a mode stirrer may be provided on the disc 62 extending into the chamber to evenly distribute the microwave energy in the chamber.

Although it is to be understood that the module 20 can have different shapes and locations of certain components, the first embodiment of FIG. 2 has the magnetron 40 located on the disc 70 and the thermal imaging device 42 mounted on disc 72. The thermal imaging device 42 is preferably a digital camera capable of monitoring the temperature of the liner 12. As illustrated by the embodiment of FIG. 8, It should be understood, however, that the module 20 may have as many as four discs forming three chambers, and that the microwave applicator and thermal imaging camera can be positioned in different relative locations as long as the components of the module are arranged to most efficiently contain and direct the microwave energy onto the liner 12 as the module is moved along the liner 12 in the manner described hereinafter.

Figure 8:
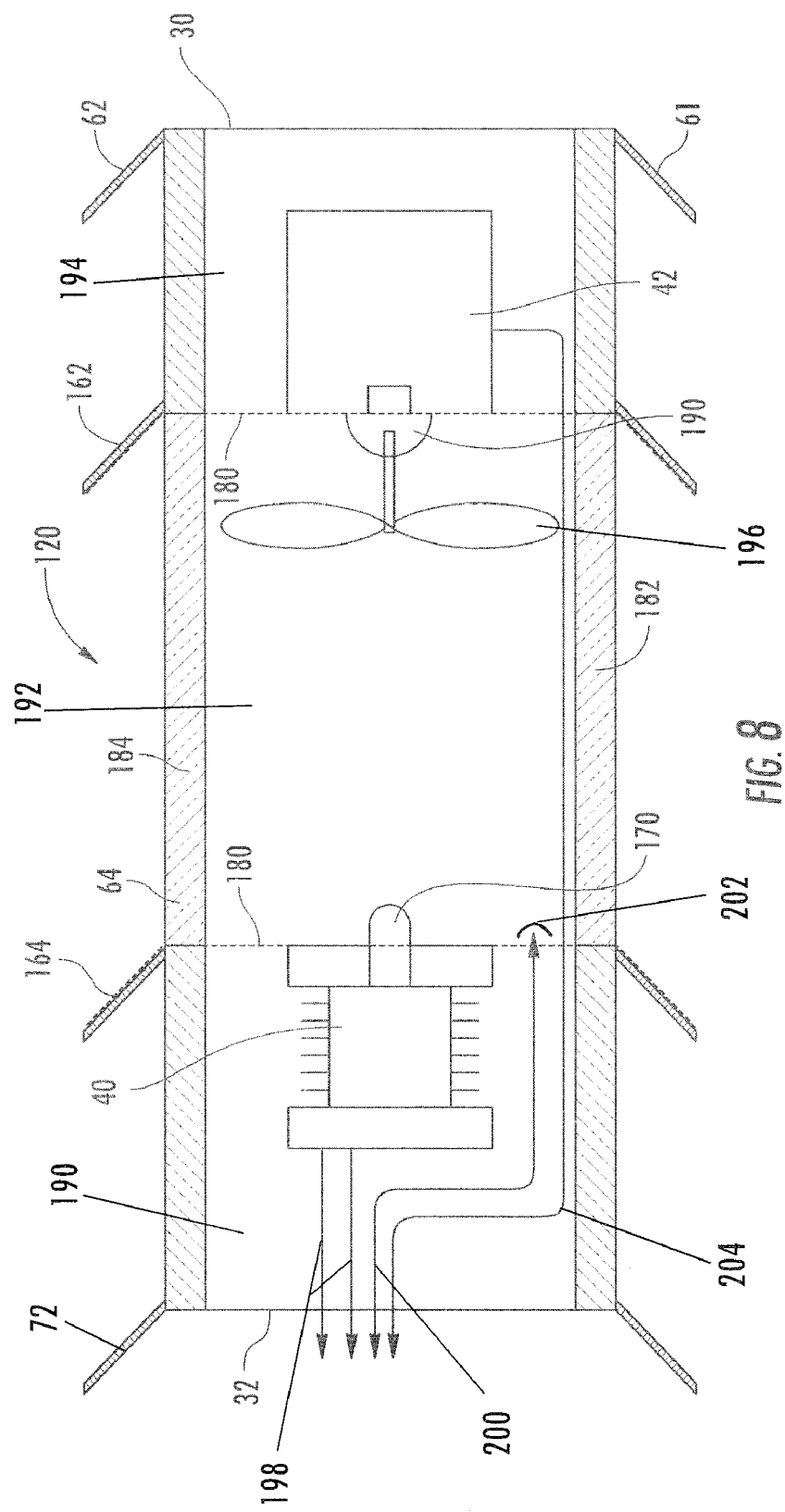
FIG. 8 is view of the module partly in section to show the interior of another embodiment of the invention.

Referring now to FIG. 8, the module 120 has a cylindrical shaped, hollow main body 64 that is divided into three chamber 190, 192 and 194 by discs 162 and 164 that include microwave screens 180 that confine microwave energy to the chamber 192. The module 120 has a front end 30 and a rear end 32. Front end 30 has a disc 62 that extends outwardly beyond the main body 64. Similarly, rear end 32 has a disc 72 that extends outwardly from main body 64. Mounted in chamber 190 is a magnetron 40 that has a microwave applicator 170 extending into chamber 192 to emit and dissipate microwaves throughout chamber 192. If desired, an air-driven mode stirrer 196 can be used to assist in more evenly distributing the microwave energy. The portion of the main body 64 that forms the exterior wall 184 between discs 180, is formed of a microwave transparent dielectric, such as glass, that allow the microwave energy in chamber 192 to pass through. The discs 162 and 164 are formed of a metallic material or provided with a metallic backing on the sides adjacent the exterior wall 184 to contain the microwaves and direct them to the portion of the liner 12 between the discs 162 and 164 where they can be absorbed by the resin in the liner 12. A thermal imaging device, such as a camera 42 having a lens 190 extending into chamber 192, is mounted in chamber 194. Similar to the embodiment of FIG. 2, a cable 34 (not shown in FIG. 8) can serve as the means to bring power from a suitable power supply 36 to the module 120 and connect the module 120 to a control station 38. Cable 34 can contain a high-voltage DC cable 198 to power the magnetron 40 and cable 34 can also carry a line 200 to a detector 202 and a line 204 that is the power and video feed to the thermal imaging device 42. As in the embodiment of FIG. 2, cable 34 is also connected to winch 44 to control movement of the module 120.

In operation, and again referring to FIG. 1, after the module 20 or 120 (both referred to hereinafter as simply module 20) is inserted at the first end 16 of the liner 12 and the second covering 46 is secured over the first end 16, the air supply 54 is connected to the second covering 46 at the first opening 50. As air is pumped into the liner 12 through the second covering 46 toward the second end 18 of the liner 12, the pressure created by the air begins to exert a force on the module 20, while also keeping the liner 12 inflated and occupying the pipe 14. If for some reason the air pressure falls below a certain pressure, pressure sensitive safety switches as well as horizontal level monitoring switches (not shown) can be combined with the module 20 to automatically shut down the module 20. The force provided by the pressurized air is sufficient to propel the module 20 from the first end 16 to the second end 18 of the liner 12. However, the cable 34 attached to the winch 44 maintains the module 20 in a particular location within the pipe 14. By controlling the air pressure and the length of the cable 34, the module 20 can be systematically and selectively moved by allowing a portion of the cable 34 to unwind from the winch 44. The pressure from the air then moves the module 20 until the slack in the cable 34 is taken up. Once again the module 20 is stopped and maintained at a specific position until more cable is released by the winch 44. The movement of the module 20 and the operation of the magnetron 40 is preferably controlled through the control station 38 located outside of the pipe 14, and the movement of the module can be continuous or movement can be intermittent. To effectively cure most liner resins, movement of the module is typically about ten feet per minute.

As the module 20 makes its way through the pipe 14, the magnetron 40 selectively emits radiation in the form of microwaves. The amount and intensity of the microwaves are preferably controlled by the power supply 36 and computer software housed at the control station 84 which also controls the winch 44. The microwaves will effectively raise the temperature of the resin 82 in the layer 17 of liner 12 to accelerate the curing process. As previously described, the discs 70 and 72 of the module 20 and discs 162 and 164 of module 120 are made of materials that confine most of the microwaves into the chamber where the microwaves are applied so that the microwaves exit the module through the exterior wall of the chamber where they can be absorbed by the resin 82 of the liner 12. The microwave impermeable layer 19 can help prevent microwaves escaping to the outside environment. The thermal imaging device 42 monitors the status of the temperature of the resin 82 in the liner 12. Once the resin and catalyst combination reach a temperature that causes an exothermic reaction, movement of the module 20 can advance and will be moved a selected distance within the pipe 14 to begin to cure another portion of the resin 82 in the liner 12. The process is repeated or run continuously until the entire length of the liner has been treated.

Once the module 20 has reached the second end 18 of the liner 12, the covering 22 can be removed from the second end 18 and the module 20 removed and the cable 34 disconnected from the module 20. The winch 44 can then be reversed to extract the cable 34 from the first end 16. The second covering 46 can then be removed as well, leaving a cured liner 12 in the pipe 14.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A method of lining a passageway with a liner containing a curable resin, comprising:
   introducing the liner into and along the passageway;
   providing air pressure within the liner to maintain the liner in contact with the passageway;
   inserting a microwave applicator into the passageway;
   emitting radiation from the microwave applicator to deposit thermal energy into the resin and thereby initiate curing of the resin in the liner; and
   utilizing the air pressure within the liner to directly move the applicator, while maintaining a sufficient pressure to maintain the liner in contact with the passageway on a first side of the microwave applicator and a second side of the microwave applicator;
   wherein the air pressure is a positive pressure on the first side of the applicator and the second side of the applicator;
   wherein the air pressure provides a force to propel the applicator through the passageway.

2. The method of claim 1, wherein:
   the liner has a first end and a second end;
   the microwave applicator comprises a magnetron;
   a module containing the magnetron is inserted into the first end of the liner;
   the module is moved toward the second end of the liner directly by the air pressure.

3. The method of claim 2, wherein:
   a winch having a cable is operatively connected to the module, the winch controlling the rate at which the module moves through the liner.

4. The method of claim 3, wherein:
   the module further includes a thermal imaging device;

the module moves substantially the entire length of the liner;
the module is removed at the second end of the liner;
the thermal imaging device trails the magnetron within the liner and monitors the progression of the cure of the resin.

5. The method of claim 3, wherein:
the module further includes a thermal imaging camera;
the module moves the entire length of the liner;
the module is removed at the second end of the liner;
the thermal imaging camera precedes the magnetron within the liner and measures the temperature of the resin to thereby monitor the progression of the cure of the resin.

6. The method of claim 2, wherein:
the module further comprises a thermal imaging device;
the device measuring the temperature of the resin to thereby monitor the progression of the cure of the resin.

7. The method of claim 6, wherein:
the module moves substantially the entire length of the liner; and
the module is removed at the second end of the liner.

8. A method of curing a liner containing a curable resin that lines a passageway, comprising:
providing air pressure within the passageway to maintain the liner in contact with the passageway;
inserting a module containing a microwave applicator into the passageway;
emitting radiation from the microwave applicator to deposit thermal energy into the resin and thereby initiate curing of the resin in the liner;
wherein the liner has a length, a first end and a second end;
the module is inserted into the first end and removed at the second end;
the module further comprises a thermal imaging device that measures the temperature of the resin to thereby monitor the progression of the cure of the resin;
the air pressure within the passageway directly moves the module, while maintaining a sufficient pressure to maintain the liner in contact with the passageway on a first side of the module and a second side of the module;
a winch controls the rate at which the module moves through the liner;
wherein the air pressure is a positive pressure on the first side of the module and the second side of the module;
wherein the air pressure provides a force to propel the module through the passageway.

9. The method of claim 8, wherein:
the module moves substantially the entire length of the liner.

10. The method of claim 9, wherein:
the winch is in constant communication with the module and is used to withdraw the module.

11. The method of claim 9, wherein:
the module can traverse a pipe at least four inches in diameter.

12. The method of claim 11, wherein:
the module moves through the pipe at approximately ten feet per minute;
the module receives power from a power supply located outside of the passageway.

\* \* \* \* \*